US008429607B2

(12) United States Patent
Son et al.

(10) Patent No.: US 8,429,607 B2
(45) Date of Patent: Apr. 23, 2013

(54) METHOD AND APPARATUS FOR MANAGING VARIABILITY POINTS

(75) Inventors: Kyoung-ho Son, Suwon-si (KR); Ja-gun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1074 days.

(21) Appl. No.: 12/023,235

(22) Filed: Jan. 31, 2008

(65) Prior Publication Data
US 2008/0320439 A1 Dec. 25, 2008

(30) Foreign Application Priority Data

Jun. 22, 2007 (KR) .................. 10-2007-0061844

(51) Int. Cl.
*G06F 9/44* (2006.01)
*G06F 9/45* (2006.01)

(52) U.S. Cl.
USPC .......... 717/117; 717/100; 717/104; 717/107; 717/120; 717/131; 717/168

(58) Field of Classification Search .......... None
See application file for complete search history.

(56) References Cited

U.S. PATENT DOCUMENTS

| 6,341,369 | B1 * | 1/2002 | Degenaro et al. | 717/117 |
| 6,745,381 | B1 * | 6/2004 | Ehnebuske et al. | 717/100 |
| 7,017,142 | B1 * | 3/2006 | Ehnebuske et al. | 717/100 |
| 7,373,635 | B2 * | 5/2008 | Guyette | 717/120 |
| 7,412,687 | B2 * | 8/2008 | Goodwin et al. | 717/107 |
| 7,721,252 | B2 * | 5/2010 | Choi et al. | 717/100 |
| 8,086,994 | B2 * | 12/2011 | O'Connell et al. | 717/100 |
| 8,141,038 | B2 * | 3/2012 | O'Connell et al. | 717/120 |
| 2002/0053070 | A1 * | 5/2002 | Seki | 717/107 |
| 2002/0100025 | A1 * | 7/2002 | Buechner et al. | 717/131 |
| 2003/0028364 | A1 * | 2/2003 | Chan et al. | 704/1 |
| 2005/0049843 | A1 * | 3/2005 | Hewitt et al. | 703/14 |
| 2005/0085937 | A1 | 4/2005 | Goodwin et al. | |

(Continued)

FOREIGN PATENT DOCUMENTS

| CN | 1357822 A | 7/2002 |
| JP | 09160765 A | 6/1997 |

(Continued)

OTHER PUBLICATIONS

Tommi Myllymaki, Variability Management in Software Product Lines [online], Mar. 12, 2001 [retrieved on Jul. 21, 2011]. Retrieved from the internet: <URL: http://practise2.cs.tut.fi/pub/papers/VarMgnFinal.pdf>. pp. 1-46.*

(Continued)

*Primary Examiner* — Don Wong
*Assistant Examiner* — Anibal Rivera
(74) *Attorney, Agent, or Firm* — Sughrue Mion, PLLC

(57) ABSTRACT

Provided are a method and apparatus for managing variability points that represent variability of components of software. The method includes connecting variability points of components to each other and also connecting at least one variability point of the components to a corresponding variability point of at least one of source code and build script; receiving an input having a predetermined value and setting the predetermined value to a variability point of the components; reflecting corresponding values of the predetermined value to the connected variability point of at least one of the source code and build script.

22 Claims, 14 Drawing Sheets

U.S. PATENT DOCUMENTS

| | | | |
|---|---|---|---|
| 2005/0119984 A1* | 6/2005 | Rouvellou et al. | 717/117 |
| 2005/0223363 A1* | 10/2005 | Black-Ziegelbein et al. | 717/127 |
| 2006/0136864 A1* | 6/2006 | Choi et al. | 717/104 |
| 2006/0136914 A1* | 6/2006 | Marascio et al. | 718/100 |
| 2006/0161891 A1* | 7/2006 | Ehnebuske et al. | 717/117 |
| 2006/0271557 A1* | 11/2006 | Harward et al. | 707/10 |
| 2007/0150852 A1* | 6/2007 | Balderas et al. | 717/104 |
| 2007/0150882 A1* | 6/2007 | Pena et al. | 717/168 |
| 2008/0086717 A1* | 4/2008 | Brunn et al. | 717/117 |

FOREIGN PATENT DOCUMENTS

| | | |
|---|---|---|
| JP | 2006031424 A | 2/2006 |
| KR | 1020060068162 A | 6/2006 |
| KR | 10-2008-0076059 A | 8/2008 |
| WO | WO 0148603 A1 | 7/2001 |

OTHER PUBLICATIONS

Sharam Hekmat, UML Process [online], 2005 [retrieved on Jul. 7, 2011]. Retreived from the internet: <URL: http://www.pragsoft.com/books/UMLProcess.pdf>. pp. 1-60.*

Jan Bosch et al., Variability Issues in Software Product Lines, 2002, [Retrieved on May 1, 2012]. Retrieved from the internet: <URL: http://www.springerlink.com/content/tpw4xc6tl8k345dt/fulltext.pdf> 9 Pages (13-21).*

N. Yasemin Topaloglu et al., Modeling the Variability of Web Services from a Pattern Point of View, 2004, [Retrieved on May 1, 2012]. Retrieved from the internet: <URL: http://www.springerlink.com/content/yk0hrlq2917lv8tm/fulltext.pdf> 11 Pages (128-138).*

Tijs van der Storm et al., Variability and Component Composition, 2004, [Retrieved on May 1, 2012]. Retrieved from the internet: <URL: http://www.springerlink.com/content/k3nlvkm5uqj425x3/fulltext.pdf> 10 Pages (157-166).*

Communication issued Dec. 9, 2010 by State Intellectual Property Office of P.R. China in counterpart Chinese Application No. 200810082235.4.

Chong-Mok Park, EunSang Bak, Seokjin Hong, Yoon-Hee Choi, "A Component Model and Language Supporting Static Composition of Legacy Embedded Software", Samsung Tech. Conference.

* cited by examiner

FIG. 8

Root composite component (810)

```
component T5 {
  contains {
    L cL;
    M cM;
  }
  connects {
    connect cM.irl_C to cL.ipl_C ;
  }
  configuration -variables {
    T5_VAR1 represents cL.VAR1;
    T5_VAR2 represents cL.VAR1;
  }
};
```

Composite component (820)

```
component L {
  contains {
    A1 cA1;
    A2 cA2;
    D cD;
  }
  requires {
    LC irl_C;
  }
  connects {
    connect cD.irl_A to switch {
      cA1.ipl_A on VAR1= value1
      cA2.ipl_A on VAR1= value2
    };
    connect cD.irl_C to irl_C ;
  }
  configuration -variables {
    VAR1 values (value1, value2) on default value ;
  }
};

component M {
  contains {
    B cB optional VAR2 = on ;
    C cC;
  }
  provides {
    LC ipl_C;
  }
  connects {
    connect cC.irl_B1 to cB1.ipl_B1;
    connect cC.irl_B2 to cB2.ipl_B2;
    connect cC.irl_C to ipl_C;
  }
  configuration -variables {
    VAR2 values (on, off) default on ;
  }
};
```

Primitive component (830)

```
component A1 {
  provides {
    LA ipl_A ;
  }
};

component A2 {
  provides {
    LA ipl_A ;
  }
};

component B1 {
  provides {
    LB1 ipl_B1 ;
  }
};

component B2 {
  provides {
    LB2 ipl_B2 ;
  }
};

component B {
  contains {
    B1 cB1;
    B2 cB2;
  }
  provides {
    LB1 ipl_B1;
    LB2 ipl_B2;
  }
  connects {
    connect cB1.ipl_B1 to ipl_B1;
    connect cB2.ipl_B2 to ipl_B2;
  }
};
```

FIG. 9

```
Component T6 {
  contains {
    A cA ;
    B cB;
  }
  provides {
    LA1 ipLA1;
    LA2 ipLA2;
    LB1 ipLB1;
    LB2 ipLB2;
    LB3 ipLB3;
  }
  connects {
    connect cA.ip_A1 to ipLA1;
    connect cA.ip_A2 to ipLA2;
    connect cB.ip_B1 to ipLB1;
    connect cB.ip_B2 to ipLB2;
    connect cB.ip_B3 to ipLB3;
  }
  configuration - variables {
    T6_VAR1 represents cA.A_VAR1;
    T6_VAR2 represents cA.A_VAR2;
    T6_VAR3 represents cA.A_VAR1;
    T6_VAR4 represents cA.A_VAR2;
    T6_VAR5 represents cA.A_VAR3;
  }
};
```
— 910

```
Component A {
  contains {
    A1 cA1 optional on A_VAR1 = on ;
    A2 cA2 optional on A_VAR2 = on ;
  }
  provides {
    LA1 ipLA1;
    LA2 ipLA2;
  }
  configuration - variables {
    A_VAR1 values ( on, off);
    A_VAR2 values ( on, off);
  }
};
```
— 920

```
Component B {
  contains {
    B1 cB1 optional on B_VAR1 = on ;
    B2 cB2 optional on B_VAR2 = on ;
    B3 cB3 optional on B_VAR3 = on ;
  }
  provides {
    LB1 ipLB1;
    LB2 ipLB2;
    LB3 ipLB3;
  }
  configuration - variables {
    B_VAR1 values ( on, off);
    B_VAR2 values ( on, off);
    B_VAR3 values ( on, off);
  }
};
```
— 930

FIG. 10

```
Component T7 {
    contains {
        A cA;
        B cB;
    }
    provides {
        LA1 ipLA1;
        LA2 ipLA2;
        LB1 ipLB1;
        LB2 ipLB2;
        LB3 ipLB3;
    }
    connects {
        connect cA.ip_A1 to ipLA1;
        connect cB.ip_A2 to ipLA2;
        connect cB.ip_B1 to ipLB1;
        connect cB.ip_B2 to ipLB2;
        connect cB.ip_B3 to ipLB3;
    }
    configuration - variables {
        T7_VAR1 represents (cA.A_VAR1, cA.A_VAR2);
        T7_VAR2 represents (cB.B_VAR1, cB.B_VAR2, cB.B_VAR3);
    }
};
```
1010

```
Component A {
    contains {
        A1 cA1 optional on A_VAR1 = on ;
        A2 cA2 optional on A_VAR2 = on ;
    }
    provides {
        LA1 ipLA1;
        LA2 ipLA2;
    }
    configuration - variables {
        A_VAR1 values ( on, off);
        A_VAR2 values ( on, off);
    }
};
```
1020

```
Component B {
    contains {
        B1 cB1 optional on B_VAR1 = on ;
        B2 cB2 optional on B_VAR2 = on ;
        B3 cB3 optional on B_VAR3 = on ;
    }
    provides {
        LB1 ipLB1;
        LB2 ipLB2;
        LB3 ipLB3;
    }
    configuration - variables {
        B_VAR1 values ( on, off);
        B_VAR2 values ( on, off);
        B_VAR3 values ( on, off);
    }
};
```
1030

FIG. 11

```
Component T8 {
  contains {
    A cA;
    B cB;
  }
  provides {
    LA1 ipLA1;
    LA2 ipLA2;
    LB1 ipLB1;
    LB2 ipLB2;
    LB3 ipLB3;
  }
  connects {
    connect cA.ip_A1 to ipLA1;
    connect cB.ip_A2 to ipLA2;
    connect cB.ip_B1 to ipLB1;
    connect cB.ip_B2 to ipLB2;
    connect cB.ip_B3 to ipLB3;
  }
  configuration - variables {
    T8_VAR1 values (
      type 1 represents (cA.A_VAR1=on, cA_VAR2 = off),
      type 1 represents (cA.A_VAR1=off, cA_VAR2 = on));
    T8_VAR2 values (
      type 1 represents (cB.A_VAR1=on, cB.B_VAR2 = on, cB_VAR3= on),
      type 2 represents (cB.A_VAR1=on, cB.B_VAR2 = off, cB_VAR3= on),
      type 3 represents (cB.A_VAR1=off, cB.B_VAR2 = on, cB_VAR3= off),
      type 4 represents (cB.A_VAR1=off, cB.B_VAR2 = off, cB_VAR3= off));
  }
};
```
1110

```
Component A {
  contains {
    A1 cA1 optional on A_VAR1 = on;
    A2 cA2 optional on A_VAR2 = on;
  }
  provides {
    LA1 ipLA1;
    LA2 ipLA2;
  }
  configuration - variables {
    A_VAR1 values ( on, off);
    A_VAR2 values ( on, off);
  }
};
```
1120

```
Component B {
  contains {
    B1 cB1 optional on B_VAR1 = on;
    B2 cB2 optional on B_VAR2 = on;
    B3 cB3 optional on B_VAR3 = on;
  }
  provides {
    LB1 ipLB1;
    LB2 ipLB2;
    LB3 ipLB3;
  }
  configuration - variables {
    B_VAR1 values ( on, off);
    B_VAR2 values ( on, off);
    B_VAR3 values ( on, off);
  }
};
```
1130

FIG. 12

```
Component T9 {
  contains {
    A cA;
    B cB;
  }
  provides {
    LA1 ipLA1;
    LA2 ipLA2;
    LB1 ipLB1;
    LB2 ipLB2;
    LB3 ipLB3;
  }
  connects {
    connect cA.ip_A1 to ipLA1;
    connect cB.ip_A2 to ipLA2;
    connect cB.ip_B1 to ipLB1;
    connect cB.ip_B2 to ipLB2;
    connect cB.ip_B3 to ipLB3;
  }
  configuration – variables {
    T9_VAR values (
      type 1 represents (cB.A_VAR1=off, cA.A_VAR2 = on, cB.B_VAR1=on, cB.B_VAR2=on, cB.B_VAR3=on),
      type 2 represents (cB.A_VAR1=on,  cA.A_VAR2 = off, cB.B_VAR1=on, cB.B_VAR2=on, cB.B_VAR3=on),
      type 3 represents (cB.A_VAR1=on,  cA.A_VAR2 = on, cB.B_VAR1=off, cB.B_VAR2=on, cB.B_VAR3=on),
      type 4 represents (cB.A_VAR1=on,  cA.A_VAR2 = on, cB.B_VAR1=on, cB.B_VAR2=off, cB.B_VAR3=on),
      type 5 represents (cB.A_VAR1=on,  cA.A_VAR2 = on, cB.B_VAR1=on, cB.B_VAR2=on, cB.B_VAR3=off),
  }
};
```
— 1210

```
Component A {
  contains {
    A1 cA1 optional on A_VAR1 = on ;
    A2 cA2 optional on A_VAR2 = on ;
  }
  provides {
    LA1 ipLA1;
    LA2 ipLA2;
  }
  configuration – variables {
    A_VAR1 values ( on, off);
    A_VAR2 values ( on, off);
  }
};
```
— 1220

```
Component B {
  contains {
    B1 cB1 optional on B_VAR1 = on ;
    B2 cB2 optional on B_VAR2 = on ;
    B3 cB3 optional on B_VAR3 = on ;
  }
  provides {
    LB1 ipLB1;
    LB2 ipLB2;
    LB3 ipLB3;
  }
  configuration – variables {
    B_VAR1 values ( on, off);
    B_VAR2 values ( on, off);
    B_VAR3 values ( on, off);
  }
};
```
— 1230

FIG. 15

| Level | Component Name | Variable | Configuration | | | |
|---|---|---|---|---|---|---|
| | | | T1 | T2 | T3 | T4 |
| root composite | MP3P | DEVICE_TYPE | on | off | on | off |
| 1st level composite | HAL | DMB_SUPPORT | T | - | S | - |
| | | DMB_TYPE | off | off | off | on |
| | | BLUETOOTH_SUPPORT | on | off | on | off |
| | MP3PAPP | DMB_VIEWER_SUPPORT | off | off | on | off |
| | | BOOK_READER_SUPPORT | off | off | off | on |
| | | LYRICS_VIEWER_SUPPORT | on | off | on | on |
| | | MOVIE_VIEWER_SUPPORT | on | on | off | on |
| | | PHOTO_VIEWER_SUPPORT | on | off | on | on |
| | | RADIO_SUPPORT | off | on | on | on |
| | | VOICE_RECORDER_SUPPORT | off | on | on | on |
| | MP3PMW | AVMS_AUDIO_ENCODER_SUPPORT | off | on | on | on |
| | | AVMS_AUDIO_SET | high | low | high | high |
| | | AVMS_VIDEO_SET | high | none | none | low |
| | | GWES_FLASH_SUPPORT | off | off | off | on |
| | UTIL | GWES_LANGUAGE_SET | domestic | europe | global | domestic |
| | | — | - | - | - | - |
| 2nd level composite | AVMS | AUDIO_DECODER_SUPPORT | on | on | on | on |
| | | AUDIO_CODEC_MP3_SUPPORT | on | on | on | on |
| | | AUDIO_CODEC_WMA_SUPPORT | on | off | on | on |
| | | AUDIO_CODEC_OGG_SUPPORT | on | off | off | on |
| | | VIDEO_DECODER_SUPPORT | off | off | off | on |
| | | VIDEO_CODEC_MPG_SUPPORT | on | on | on | on |
| | | VIDEO_CODEC_WMV_SUPPORT | on | off | on | on |
| | | VIDEO_CODEC_DIVX_SUPPORT | off | off | off | off |
| | | AUDIO_ENCODER_SUPPORT | on | on | on | on |
| | GWES | LANGUAGE_EN_SUPPORT | on | on | on | on |
| | | LANGUAGE_CN_SUPPORT | off | off | on | off |
| | | LANGUAGE_FR_SUPPORT | on | off | off | off |
| | | LANGUAGE_KR_SUPPORT | on | off | off | on |
| | | FLASH_SUPPORT | off | off | off | on |

METHOD AND APPARATUS FOR MANAGING VARIABILITY POINTS

CROSS-REFERENCE TO RELATED PATENT APPLICATION

This application claims the benefit of Korean Patent Application No. 10-2007-0061844, filed on Jun. 22, 2007, in the Korean Intellectual Property Office, the disclosure of which is incorporated herein in its entirety by reference.

BACKGROUND OF THE INVENTION

1. Field of the Invention

The present invention relates to a method and apparatus for managing variability points that represent variability of components of software.

2. Description of the Related Art

As software technology has developed, demand for a method of efficiently managing resources of software, which are getting larger and more complicated, has increased. In particular, research has predominantly been conducted on component-based software development (CBSD) focusing on reuse of the resources of software.

In development processes based on CBSD, when software products are developed, components may be newly generated, old components may be reused, or updated old components may be used. The purpose of CBSD is to reduce a development period and/or to reduce manufacturing costs by combining components in accordance with necessities.

Also, a software platform that includes all the various components of software has to support a new software product that is to be manufactured by combining certain software resources in accordance with necessities. The combining of the software resources basically starts by learning about elements for satisfying functions that follow requirements of a corresponding software product.

The requirements may be managed by using feature-oriented domain analysis (FODA) or a feature-oriented reuse method (FORM), which are currently being researched. In view of software product lines (SPLs) which are systems for managing and composing software elements for developing a variety of products in the software platform, the requirements are approached in consideration of variability of software products.

Meanwhile, when software for consumer electronics (CE) devices is developed, in order to appropriately reuse software resources divided into common units and variable units, components and variability points have to be managed in view of the SPLs.

Generally, in software development processes, a unified modeling language (UML) is used to represent the architecture of software or to describe logic operations. By using the UML, a designer may represent elements required to implement software in a form for easier recognition.

Currently, a UML protocol may not sufficiently represent variability points and component-based processing is not considered while only classed-based or module-based processing is allowed. Although a feature description language (FDL) is being researched as a language for composing feature-based software, when an embodiment element that is to correspond to a feature is represented, the FDL does not consider the connection with a component model in detail.

As described above, conventionally when software is developed, a method of efficiently and easily managing components and variability points does not exist.

SUMMARY OF THE INVENTION

The present invention provides a method and apparatus for efficiently and easily managing variability points.

According to an aspect of the present invention, there is provided a method of managing variability points which represent variability of components of software, the method including connecting variability points of components to each other and also connecting at least one variability point of the components to a corresponding variability point of at least one of source code and build script; receiving an input having a predetermined value and setting the predetermined value to a variability point of the components; reflecting corresponding values of the predetermined value to the connected variability point of at least one of the source code and build script.

The method may further include extracting at least one variability point from the source code if the source code is not composed based on a component model.

The extracting may include searching the source code for a conditional sentence including at least one of a pre-processor and a macro; searching a build script corresponding to the source code for a variable related to at least one of the pre-processor and macro included in the conditional sentence of the source code; and extracting at least one of the searched for pre-processor and macro as a variability point only if at least one of the searched for pre-processor and macro of the source code corresponds to the searched for variable of the build script.

The method may further include outputting a message indicating that the corresponding value of the predetermined value is reflected in at least one variability point of at least one of the source code and build script.

The connecting may include connecting a variability point of a composite component to at least one variability point of primitive components from among the variability points of the components; and connecting at least one variability point of the primitive components to a corresponding variability point of at least one of the source code and build script.

The setting may include setting the predetermined value to a variability point of a root composite component from among the variability points of the components.

The reflecting may include tracking at least one variability point of at least one of the source code and build script which corresponds to the variability points of the components; and reflecting the corresponding values of the predetermined value to at least one variability point of at least one of the source code and build script in accordance with the result of tracking.

The tracking may include tracking the variability point of at least one of the source code and build script based on position information of at least one variability point of at least one of the source code and build script.

The position information may be composed of a hash table generated by using a position of at least one variability point of at least one of the source code and build script which corresponds to the variability points of the components.

According to an aspect of the present invention, there is provided an apparatus for managing variability points which represent variability of components of software, the apparatus including a connection unit for connecting variability points of components to each other and also connecting at least one variability point of the components to a corresponding variability point of at least one of source code and build script; a setting input unit for receiving an input having a predetermined value and setting the predetermined value to a variability point of the components; a setting reflection unit for reflecting corresponding values of the predetermined value to the connected variability point of at least one of the source code and build script.

The apparatus may further include an output unit for outputting a message indicating that the corresponding value of the predetermined value is reflected in at least one variability point of at least one of the source code and build script.

The apparatus may further include a language description unit for describing the correlations displayed by the output unit by using a programming language.

The connection unit may include a component connection unit for connecting a variability point of a composite component to at least one variability point of primitive components from among the variability points of the components; and a source connection unit for connecting at least one variability point of the primitive components to a corresponding variability point of at least one of the source code and build script.

BRIEF DESCRIPTION OF THE DRAWINGS

The above and other features and advantages of the present invention will become more apparent by describing in detail exemplary embodiments thereof with reference to the attached drawings in which:

FIGS. 7 and 8 are diagrams for describing correlations among variability points of components, according to an embodiment of the present invention;

FIG. 9 is a diagram for describing correlations among variability points using variables, according to an embodiment of the present invention;

FIG. 10 is a diagram for describing correlations among variability points using variables, according to another embodiment of the present invention;

FIG. 11 is a diagram for describing correlations among variability points using variables, according to another embodiment of the present invention;

FIG. 12 is a diagram for describing correlations among variability points using variables, according to another embodiment of the present invention;

FIG. 15 is a table for describing an example in which the method of FIG. 14 is used, according to an embodiment of the present invention.

DETAILED DESCRIPTION OF EXEMPLARY EMBODIMENTS

Hereinafter, the present invention will be described in detail by explaining embodiments of the invention with reference to the attached drawings.

Figure 1:
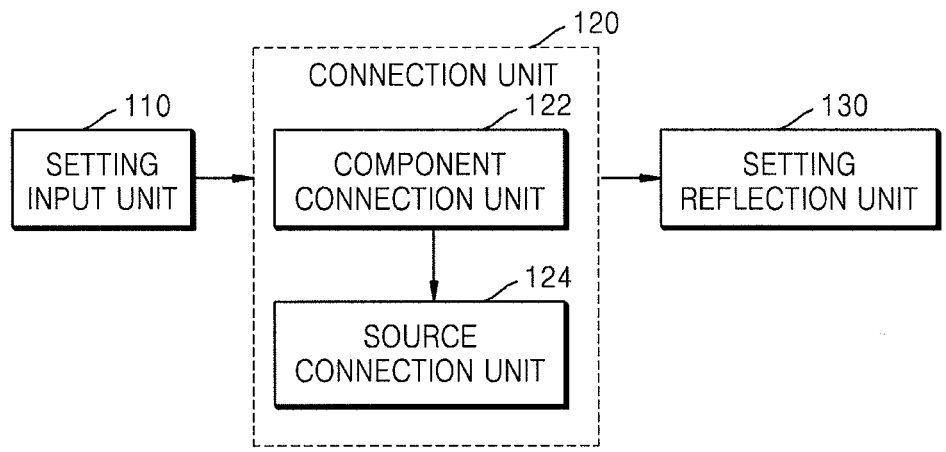
FIG. 1 is a block diagram of an apparatus for managing variability points, according to an embodiment of the present invention.

FIG. 1 is a block diagram of an apparatus for managing variability points, according to an embodiment of the present invention.

Referring to FIG. 1, the apparatus includes a setting input unit 110, a connection unit 120, and a setting reflection unit 130.

The connection unit 120 connects variability points of components to each other and also connects at least one variability point of the components to a corresponding variability point of source code and/or build script.

The connection unit 120 includes a component connection unit 122 and a source connection unit 124.

The component connection unit 122 connects a variability point of a composite component to at least one variability point of primitive components from among the variability points of the components.

Also, the component connection unit 122 determines which primitive components are used to compose the composite component. For example, the component connection unit 122 may include an instruction to compose a composite component B by using primitive components B1 and B2 and thus the composite component B may be composed by using the primitive components B1 and B2 in accordance with the instruction.

The source connection unit 124 connects at least one variability point of the primitive components to a corresponding variability point of the source code and/or build script.

Here, the variability points represent variability of components of software. In the present invention, 'option' or 'switch' are suggested as examples of the variability points. However, the variability points are not limited to 'option' or 'switch' and any other points may be variability points as long as they represent the variability of the components.

Correlations between the variability points will be described later with reference to FIGS. 3 through 13.

The setting input unit 110 receives an input having a predetermined value to be set to a variability point of the components. In more detail, when the connection unit 120 connects the variability points of the components to each other and also connects at least one variability point of the components to a corresponding variability point of the source code and/or build script, the setting input unit 110 receives a predetermined value and sets the predetermined value to a variability point of the components.

Preferably, the predetermined value is set to a variability point of a root composite component.

The setting reflection unit 130 reflects corresponding values of the predetermined value to the connected variability point of the source code and/or build script.

When the predetermined value is set to the variability point of the components, values to be set to variability points of the source code and/or build script are determined. Here, "reflect" means "set the determined values corresponding to the predetermined value to the variability points of source code and/or build script by connecting the variability points of the components and the source and/or build script."

The connection unit 120 only connects at least one variability point of the components to a corresponding variability point of the source code and/or build script, and when the predetermined value is set to a variability point of the components by the setting input unit 110, the setting reflection unit 130 sets the corresponding values of the predetermined value to the connected variability points of the source code and/or build script by connecting the variability points of the components and the source and/or build script.

Here, the setting reflection unit 130 tracks at least one variability point of the source code and/or build script which corresponds to the variability points of the components and reflects the corresponding values of the predetermined value to at least one variability point of the source code and/or build script in accordance with the result of tracking.

Here, the tracking of the variability point of the source code and/or build script is performed based on position information of at least one variability point of the source code and/or build script.

For example, position information such as project/mp3/src/avms/video/codec/mp3_decode.cpp(32) may be composed by using a physical directory position of the source code and a line position (a thirty second line) of a variability point of the source code.

Also, the position information may also be composed of a hash table generated by using a position of at least one variability point of the source code and/or build script which corresponds to the variability points of the components.

Meanwhile, the source code may not be composed based on a component model. In this case, the variability point has to be separately extracted from the source code and, preferably, the apparatus according to the current embodiment may further include an extraction unit (not shown) for extracting the variability point from the source code.

Figure 2:
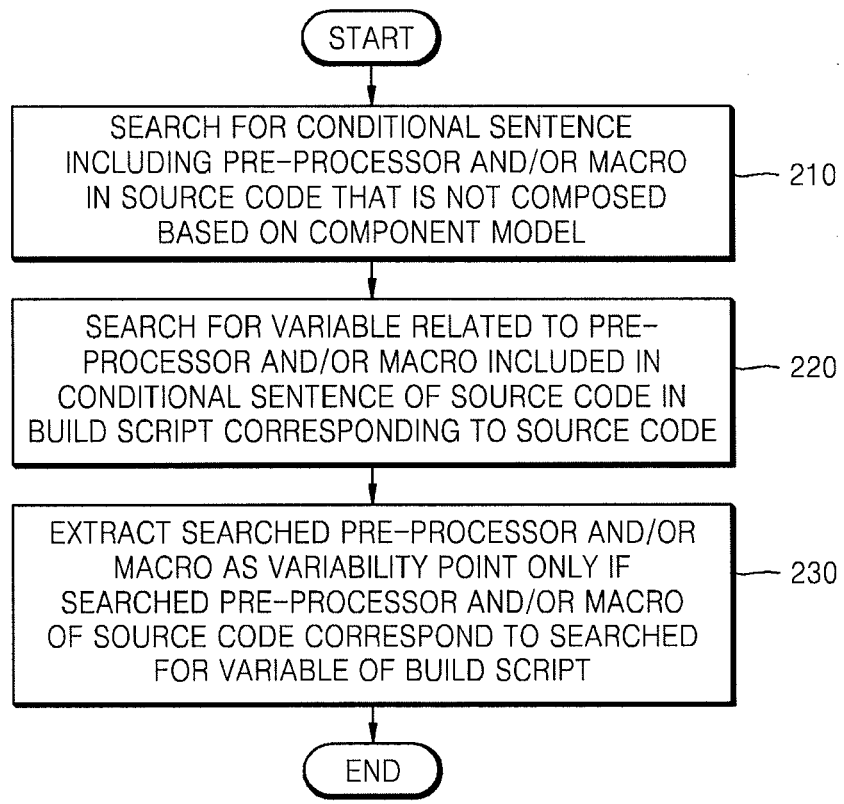
FIG. 2 is a flowchart for describing operations of an extraction unit according to an embodiment of the present invention.

FIG. 2 is a flowchart for describing operations of an extraction unit according to an embodiment of the present invention.

Referring to FIG. 2, in operation 210, a conditional sentence including a pre-processor and/or a macro is searched for in source code that is not composed based on a component model.

Here, the conditional sentence is composed of #ifdef, #if defined, #else, #elif, #endif, or the like. Code Table 1 is an example of the conditional sentence.

CODE TABLE 1 ifdef VIDEO_CODEC
....
else
....
endif

In operation 220, a variable related to the pre-processor and/or macro included in the conditional sentence of the source code is searched for in a build script corresponding to the source code.

In operation 230, only if the searched pre-processor and/or macro of the source code correspond to the searched for variable of the build script, are the searched pre-processor and/or macro extracted as a variability point.

The variability point extracted from the source code is connected to a corresponding variability point of primitive components by the source connection unit 124 illustrated in FIG. 1 and the setting reflection unit 130 illustrated in FIG. 1 reflects a corresponding value of a predetermined value set to a variability point of components to at least one variability point of the source code and/or build script.

Figure 3:
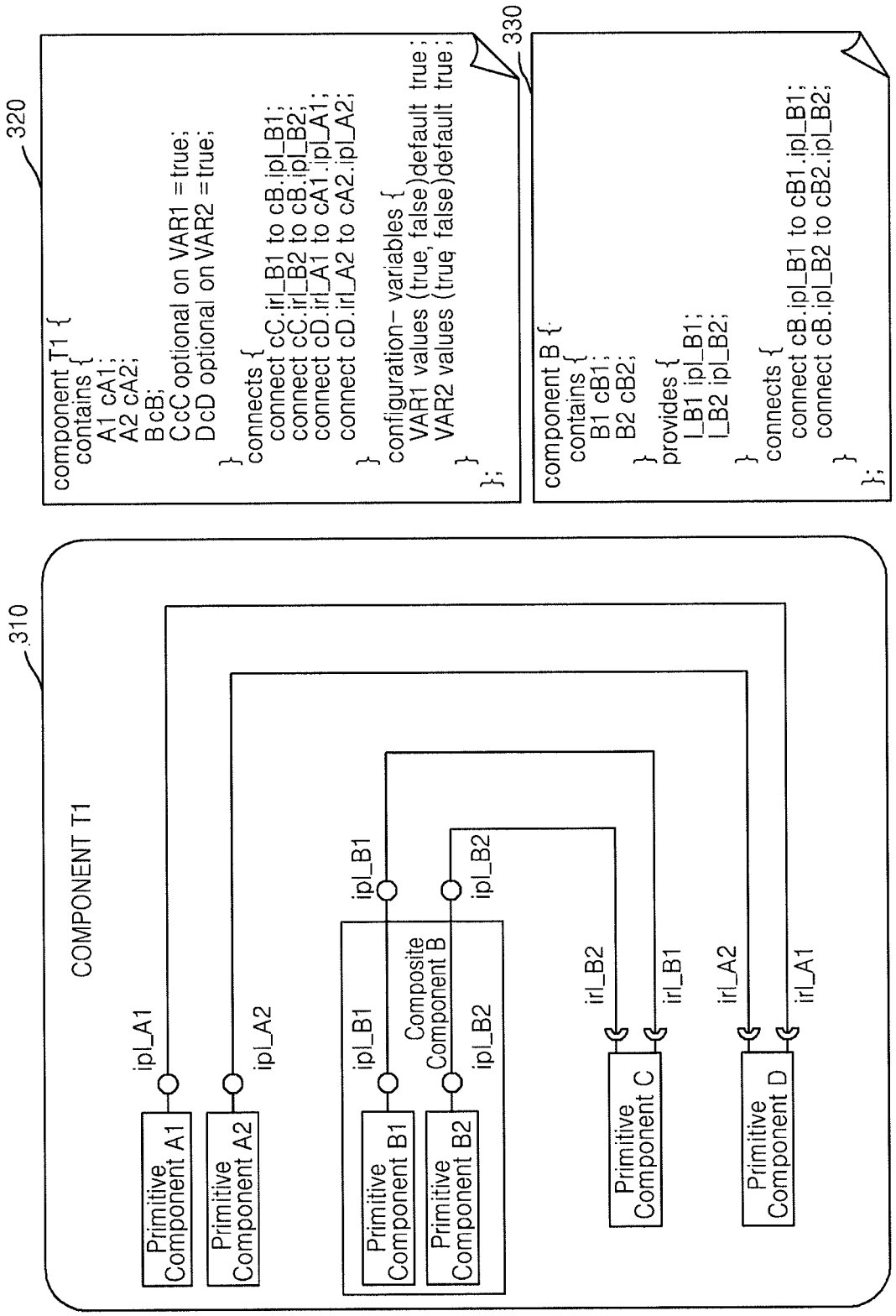
FIG. 3 is a diagram for describing correlations among components connected by using a variability point 'option', according to an embodiment of the present invention.

FIG. 3 is a diagram for describing correlations among components connected by using a variability point 'option', according to an embodiment of the present invention.

Referring to FIG. 3, a reference numeral 310 represents the correlations by using a structural graphic and reference numerals 320 and 330 show the correlations by using syntax of a programming language.

In the structural graphic 310, a root composite component T1 contains primitive components A1, A2, C, and D and a composite component B. The composite component B contains primitive components B1 and B2. Here, a root composite component is a top-level component composed of a plurality of composite components and a composite component is an upper component composed of a plurality of primitive components. Hereinafter, for convenience of explanation, root composite, composite, and primitive components are all referred to as components.

In FIG. 3, 'ipl' means an interface that has a function of a corresponding component is provided to another component and 'irl' means an interface wherein the corresponding component uses a function of another component. In the structural graphic 310, an 'ipl' interface is marked at one end of each of the components A1, A2, and B and thus functions of the components A1, A2, and B are provided to other components. An 'irl' interface is marked at one end of each of the components C and D and thus the components C and D use the functions of the components A1, A2, and B connected to the components C and D. That is, the component C uses functions of the components B1 and B2 and the component D uses functions of the components A1 and A2.

In this case, the components C and D may or may not be contained in the component T1 in accordance with a certain condition. That is, the components C and D are variably contained in the component T1 in accordance with the variability point 'option'. Accordingly, the component C is selectively connected to the components B1 and B2 and the component D is selectively connected to the components A1 and A2.

Terminologies used for the syntax 320 and 330 will now be described prior to the description of the syntax 320 and 330.

'Contain' is used to indicate components composing a composite component, 'connect' is used to indicate mutually connected components, 'configuration variables' is used to define values that a certain variable may selectively have, 'provide' is used to indicate an interface provided by a corresponding component. Based on the above-described terminologies, the syntax 320 and 330 will now be described.

In the syntax 320, the component T1 contains the components A1, A2, B, C, and D by using 'contain'. However, the components C and D may be contained in the component T1 only if variables VAR1 and VAR2 are true, respectively. The component C is connected to the components B1 and B2 so as to use the functions of the components B1 and B2 and the component D is connected to the components A1 and A2 so as to use the functions of the components A1 and A2 by using 'connect'. The variables VAR1 and VAR2 are defined to have one of "true" and "false" and have "true" as a default value by using 'configuration variables'.

The syntax 330 describes the component B in detail. The component B contains the components B1 and B2 by using 'contain', provides the functions of the components B1 and B2 to other components by using 'provide', and connects the components B1 and B2 to other components by using 'connect'.

In this case, although not shown in FIG. 3, the components A1, A2, B1, B2, C, and D are also separately defined by using the form illustrated in the syntax 330. For example, the component C may be defined as shown in Code Table 2.

CODE TABLE 2

```
component C{
  requires{
    I_B1 irl_B1;
    I_B2 irl_B2;
  }
};
```

Code Table 2 represents that the component C uses the functions of the components B1 and B2.

As such, the component connection unit 122 illustrated in FIG. 1 connects a variability point of a composite component to at least one variability point of primitive components.

Preferably, the apparatus illustrated in FIG. 1 may further include an output unit (not shown) for displaying correlations among composite and primitive components by using a graphic user interface (GUI) as shown in the structural graphic 310.

Preferably, the apparatus may further include a language description unit (not shown) for describing the correlations displayed by the output unit by using a programming language as shown in the syntax 320 and 330.

Figure 4:
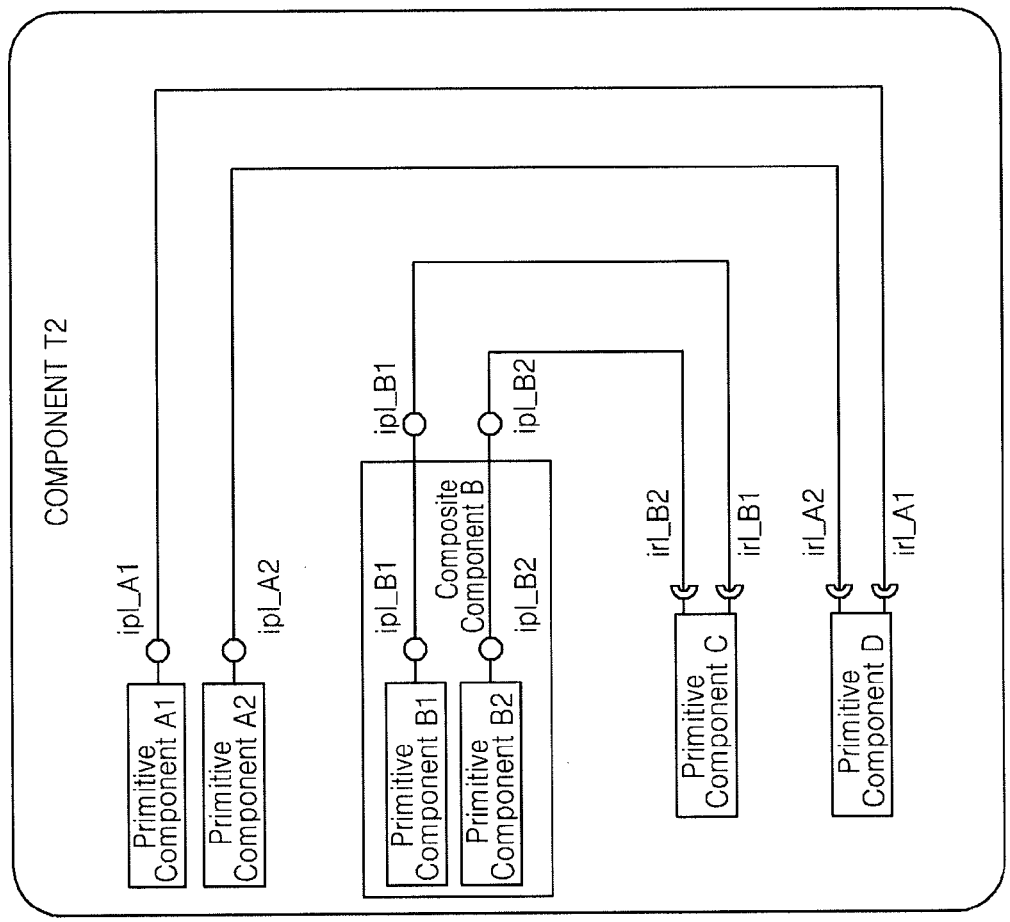
FIG. 4 is a diagram for describing correlations among components connected by using a variability point 'option', according to another embodiment of the present invention.

FIG. 4 is a diagram for describing correlations among components connected by using a variability point 'option', according to another embodiment of the present invention.

Referring to FIG. 4, the correlations among a component T2 and its sub-components are illustrated.

In FIG. 4, components A1 and B having 'ipl' interfaces are selectively connected to the component T2 by using the variability point 'option', while, in FIG. 3, the components C and D having 'irl' interfaces are variably connected to the component T1 by using the variability point 'option'.

Except for the description above, the correlations illustrated in FIG. 4 are the same as the correlations illustrated in FIG. 3 and thus detailed descriptions thereof will be omitted.

Figure 5:
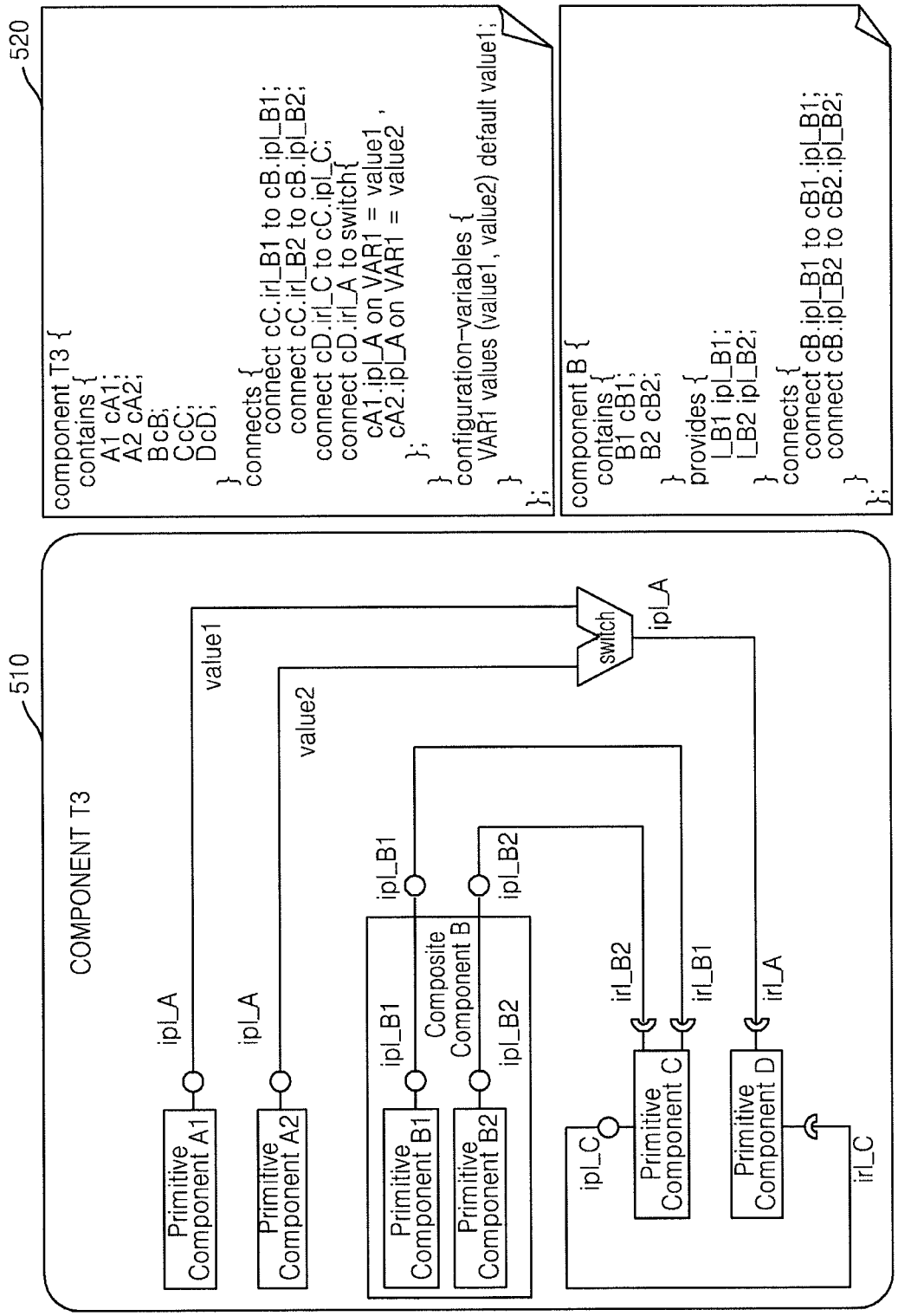
FIG. 5 is a diagram for describing correlations among components connected by using a variability point 'switch', according to an embodiment of the present invention.

FIG. 5 is a diagram for describing correlations among components connected by using a variability point 'switch', according to an embodiment of the present invention.

Referring to FIG. 5, the correlations among a component T3 and its sub-components are illustrated.

In a structural graphic 510, components A1 and A2 are connected to a component D by using the variability point 'switch'. That is, the component D is connected to one of the components A1 and A2 in accordance with a certain condition.

In a syntax 520, the component D is connected to one of the components A1 and A2 in accordance with whether a variable VAR1 is "value 1" or "value 2".

Except for the description above, the correlations illustrated in FIG. 5 are the same as the correlations illustrated in FIG. 3 and thus detailed descriptions thereof will be omitted.

Figure 6:
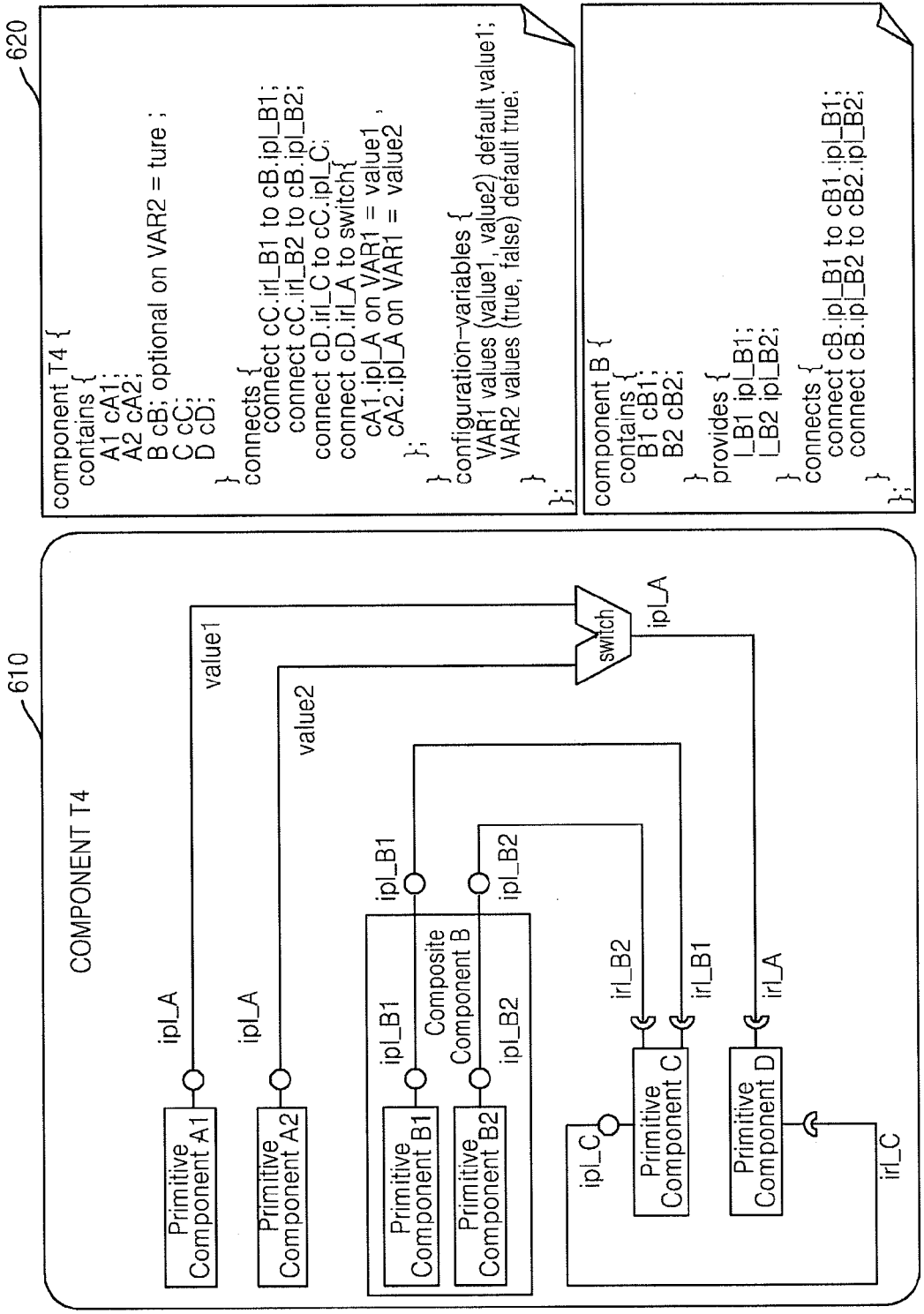
FIG. 6 is a diagram for describing correlations among components connected by using variability points 'option' and 'switch', according to an embodiment of the present invention.

FIG. 6 is a diagram for describing correlations among components connected by using variability points 'option' and 'switch', according to an embodiment of the present invention.

Referring to FIG. 6, the correlations among a component T4 and its sub-components are illustrated.

In a structural graphic 610, a component B is connected to a component C by using the variability point 'option' and components A1 and A2 are connected to a component D by using the variability point 'switch'.

In a syntax 620, if a variable VAR2 is "true", the component B is contained in the component T4, that is, is connected to the component C. The component D is connected to one of the components A1 and A2 in accordance with whether a variable VAR1 is "value 1" or "value 2".

Except for the description above, the correlations illustrated in FIG. 6 are the same as the correlations illustrated in FIG. 3 and thus detailed descriptions thereof will be omitted.

Figure 7:
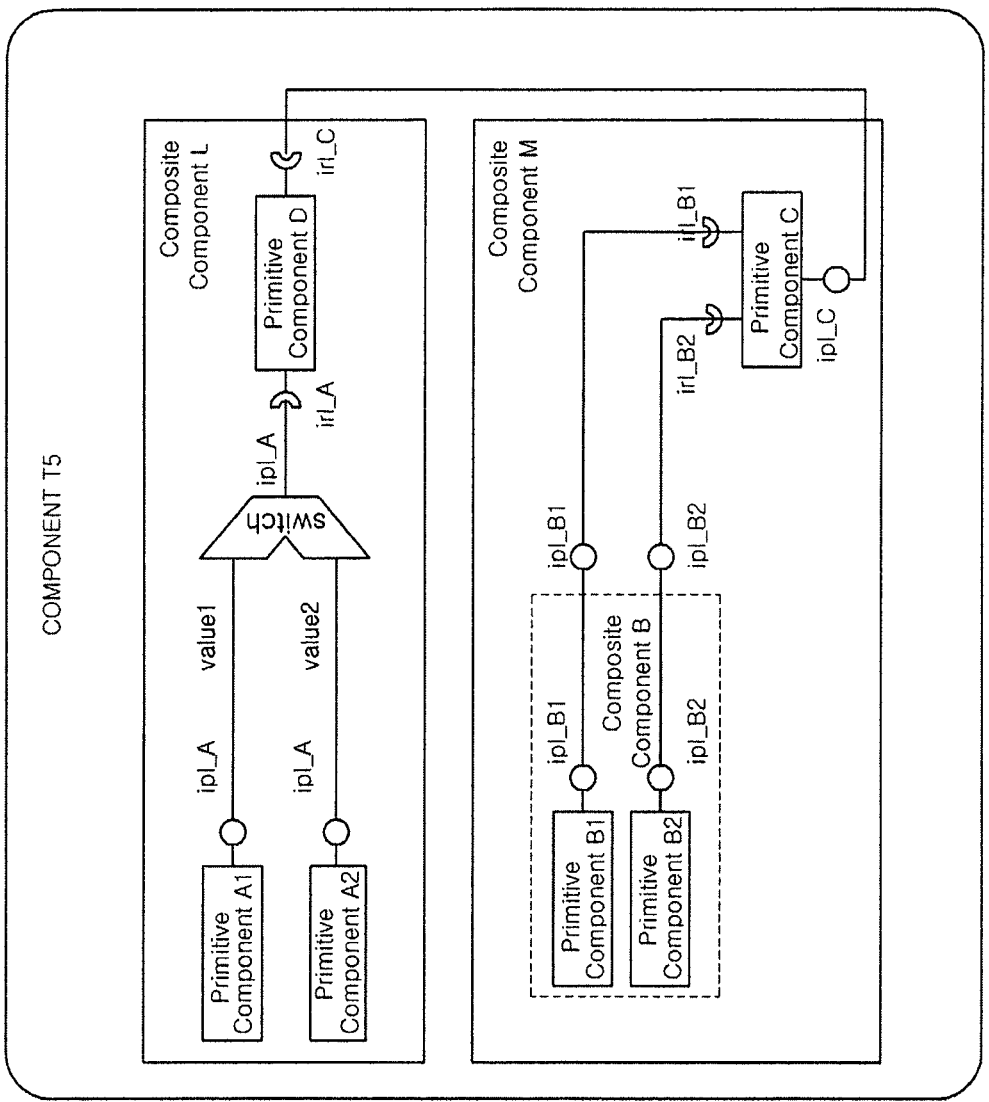

FIGS. 7 and 8 are diagrams for describing correlations among variability points of components, according to an embodiment of the present invention.

Referring to FIG. 7, a component T5 contains composite components L and M. Here, the components L and M have variability points 'switch' and 'option', respectively.

Referring to FIG. 8, a root composite component 810, that is, the component T5, composite components 820, that is, the components L and M, and primitive components 830, that is, components A1, A2, B1, B2, and B are illustrated.

In the root composite component 810, the component T5 connects the component L to the component M by using 'connect' and respectively connects variables T5_VAR1 and T5_VAR2 of the component T5 to variables VAR1 and VAR2 of the components L and M by using 'configuration variables'. As such, by respectively connecting the variables T5_VAR1 and T5_VAR2 to the variables VAR1 and VAR2, a variability point of the component T5 and variability points of the components L and M are connected to each other.

In the composite components 820, the component L connects a component D to one of the components A1 and A2 in accordance with whether the variable VAR1 is "value 1" or "value2". The component B is contained in the component M only if the variable VAR2 is "on".

In primitive components 830, the components A1, A2, B1, B2, and B provide their functions to other components connected to them.

Except for the description above, the correlations illustrated in FIGS. 7 and 8 are the same as the correlations illustrated in FIG. 3 and thus detailed descriptions thereof will be omitted.

FIG. 9 is a diagram for describing correlations among variability points using variables, according to an embodiment of the present invention.

Referring to FIG. 9, by using 'configuration variables' of a syntax 910, variables T6_VAR1 through T6_VAR5 of a component T6 are connected to variables A_VAR1, A_VAR2, B_VAR1, B_VAR2, and B_VAR3 of components A and B so as to correspond one to one.

In more detail, the variables T6_VAR1 and T6_VAR2 are respectively connected to the variables A_VAR1 and A_VAR2 of the component A and the variables T6_VAR3, T6_VAR4, and T6_VAR5 are respectively connected to the variables B_VAR1, B_VAR2, and B_VAR3 of the component B. As such, by connecting the variables T6_VAR1 through T6_VAR5 to the variables A_VAR1, A_VAR2, B_VAR1, B_VAR2, and B_VAR3, the variables T6_VAR1 through T6_VAR5 may also be "on" or "off".

Here, in a syntax 920, components A1 and A2 are contained in the component A if the variables A_VAR1 and A_VAR2 are "on", respectively. In a syntax 930, components B1, B2, and B3 are contained in the component B if the variables B_VAR1, B_VAR2, and B_VAR3 are "on", respectively. Thus, each of the components A and B has a variability point 'option'.

Accordingly, in the syntax 910, the variables T6_VAR1 through T6_VAR5 are "on" if corresponding variables of sub-components of the component T6 are "on". On the other hand, if the variables T6_VAR1 through T6_VAR5 are "on", the corresponding variables of the sub-components of the component T6 are "on".

As such, in order to set a predetermined value to a variability point of components, the predetermined value is input by the setting input unit 110 illustrated in FIG. 1.

FIG. 10 is a diagram for describing correlations among variability points using variables, according to another embodiment of the present invention.

Referring to FIG. 10, variables T7_VAR1 and T7_VAR2 of a component T7 are connected to variables A_VAR1, A_VAR2, B_VAR1, B_VAR2, and B_VAR3 of components A and B so as to correspond one to n.

In more detail, by using 'configuration variables' of a syntax 1010, the variable T7_VAR1 is connected to the variables A_VAR1 and A_VAR2 of the component A and the variable T7_VAR2 is connected to the variables B_VAR1, B_VAR2, and B_VAR3 of the component B. Here, the variables T7_VAR1 and T7_VAR2 of the component T7 are "on" only if all variables of corresponding sub-components of the component T7 are "on".

For example, the variable T7_VAR1 is "on" only if both the variables A_VAR1 and A_VAR2 are "on". By the same token, if the variable T7_VAR1 is "on", both the variables A_VAR1 and A_VAR2 are "on".

Syntax 1020 and 1030 are the same as the syntax 920 and 930 illustrated in FIG. 9 and thus detailed descriptions thereof will be omitted.

FIG. 11 is a diagram for describing correlations among variability points using variables, according to another embodiment of the present invention.

Referring to FIG. 11, variables T8_VAR1 and T8_VAR2 of a component T8 are connected to variables A_VAR1, A_VAR2, B_VAR1, B_VAR2, and B_VAR3 of components A and B so as to correspond one to n. Unlike in FIG. 10, each of the variables A_VAR1, A_VAR2, B_VAR1, B_VAR2, and B_VAR3 is set by a predetermined value.

According to the current embodiment, the variables T8_VAR1 and T8_VAR2 are set and variables of sub-components of the component T8 are set in accordance with the variables T8_VAR1 and T8_VAR2.

For example, in a syntax 1110, if the variable T8_VAR2 is "type 2", the variables B_VAR1, B_VAR2, and B_VAR3 are respectively determined to be "on", "off", and "on".

Syntax 1120 and 1130 are the same as the syntax 920 and 930 illustrated in FIG. 9 and thus detailed descriptions thereof will be omitted.

FIG. 12 is a diagram for describing correlations among variability points using variables, according to another embodiment of the present invention.

Referring to FIG. 12, a variable T9_VAR of a component T9 is set and variables of sub-components of the component T9 are set in accordance with the variable T9_VAR as in FIG. 11. However, unlike in FIG. 11, all the variables of the sub-components such as components A and B are connected to the variable T9_VAR so that when a predetermined value is set to the variable T9_VAR, all the variables of the components A and B are determined in accordance with the variable T9_VAR.

Syntax 1220 and 1230 are the same as the syntax 920 and 930 illustrated in FIG. 9 and thus detailed descriptions thereof will be omitted.

Figure 13:
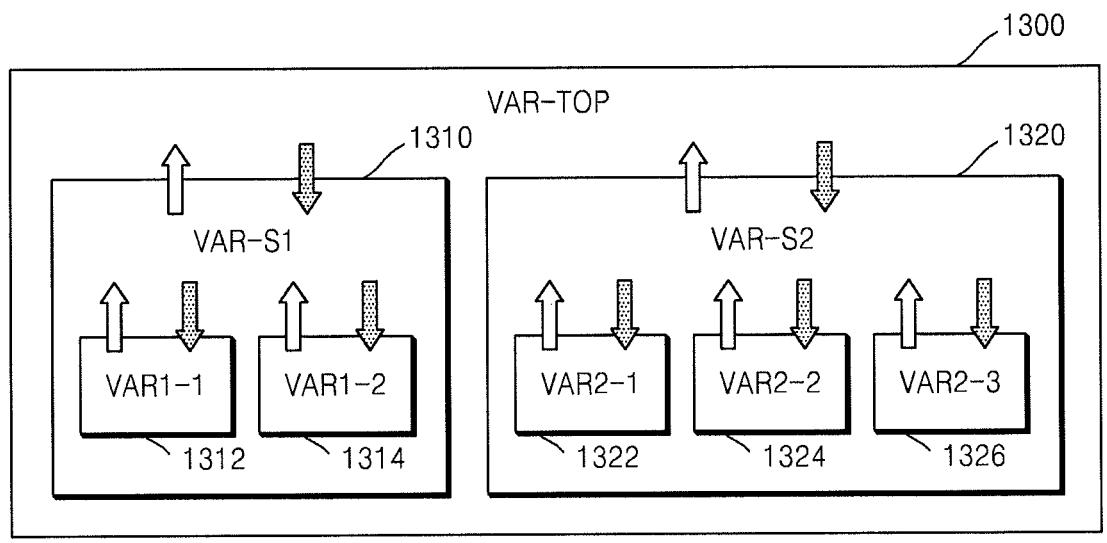
FIG. 13 is a schematic diagram for describing correlations among variability points, according to an embodiment of the present invention.

FIG. 13 is a schematic diagram for describing correlations among variability points, according to an embodiment of the present invention.

Referring to FIG. 13, variability points VAR1-1 1312 and VAR1-2 1314 of primitive components are connected to a variability point VAR-S1 1310 of a composite component, variability points VAR2-1 1322, VAR2-2 1324, and VAR2-3 1326 of other primitive components are connected to a variability point VAR-S2 1320 of another composite component, and the variability points VAR-S1 1310 and VAR-S2 1320 of the composite components are connected to a variability point VAR-TOP 1300 of a root composite component.

After the variability points VAR-TOP 1300, VAR-S1 1310, VAR-S2 1320, VAR1-1 1312, VAR1-2 1314, VAR2-1 1322, VAR2-2 1324, and VAR2-3 1326 of the root composite, composite, primitive components are connected to each other as described above, the source connection unit 124 illustrated in FIG. 1 connects at least one of the variability points VAR1-1 1312, VAR1-2 1314, VAR2-1 1322, VAR2-2 1324, and VAR2-3 1326 of the primitive components to a corresponding variability point of source code and/or build script.

Then, by setting a predetermined value to the variability point VAR-TOP 1300, corresponding values of the predetermined value are reflected in the variability points VAR1-1 1312, VAR1-2 1314, VAR2-1 1322, VAR2-2 1324, and VAR2-3 1326 as well as the variability points VAR-S1 1310 and VAR-S2 1320 by the setting reflection unit 130 illustrated in FIG. 1. Ultimately, a corresponding value of the predetermined value is reflected in the connected variability point of the source code and/or build script.

Here, after the corresponding value of the predetermined value is reflected in the connected variability point of the source code and/or build script by the setting reflection unit 130, the above-mentioned output unit (not shown) may output a message indicating that the corresponding value of the predetermined value is reflected in at least one variability point of the source code and/or build script.

Figure 14:
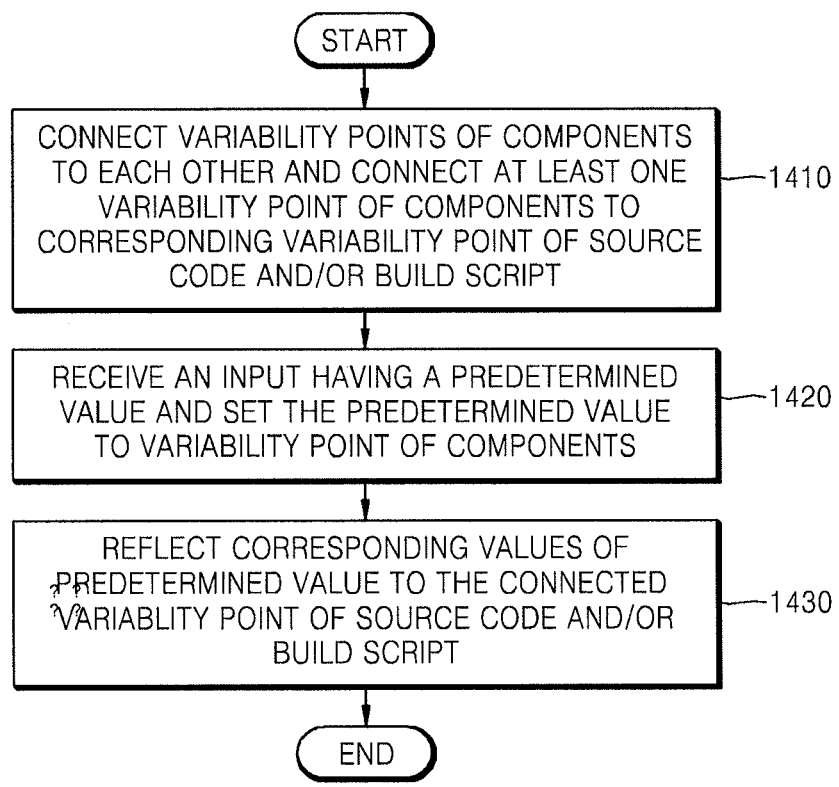
FIG. 14 is a flowchart of a method of managing variability points, according to an embodiment of the present invention.

FIG. 14 is a flowchart of a method of managing variability points, according to an embodiment of the present invention.

Referring to FIG. 14, in operation 1410, variability points of components are connected to each other and at least one variability point of the components is connected to a corresponding variability point of source code and/or build script.

In operation 1420, a predetermined value is set to a variability point of the components. Preferably, the predetermined value is set to a variability point of a root composite component.

In operation 1430, corresponding values of the predetermined value are reflected in the variability points of the components and the connected variability point of the source code and/or build script.

FIG. 15 is a table for describing an example in which the method illustrated in FIG. 14 is used, according to an embodiment of the present invention.

The table hierarchically shows the variability points on a software platform to be included in an MPEG-1 Audio Layer 3 (MP3) player.

Referring to FIG. 15, if a variable DEVICE_TYPE of a root composite component MP3P is set to one of components T1 through T4, corresponding values are reflected in connected variables such as variables DMB_SUPPORT and DMB_TYPE of composite component of the root composite component MP3P. As such, the present invention provides a method and apparatus for efficiently and easily managing variability points by connecting variability points of components to each other and also connecting at least one variability point of the components to a corresponding variability point of source code and/or build script, thereby reflecting a setting of a root-composite component to the variability points of the components and the connected variability point of the source code and/or build script.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

As described above, according to the present invention, if variability points of components are connected to each other and at least one variability point of the components is connected to a corresponding variability point of source code and/or build script, when a predetermined value is set to a variability point of the components, corresponding values of the predetermined value may be reflected in the variability points of the components and the connected variability point of the source code and/or build script, and the variability points may be efficiently and easily managed.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of managing variability points which represent variability of components of software, the method comprising:
    connecting a first variability point of a first component to at least one variability point including a second variability point of a second component and also connecting the second variability point of the second component to at least one variability point including a third variability point of source code or build script;
    receiving an input having a predetermined first value and setting the predetermined first value to the first variability point of the first component;
    reflecting a corresponding third value to the connected third variability point of the source code or build script by setting a predetermined second value which corresponds to the predetermined first value to the connected second variability point of the second component, and by setting a predetermined third value which corresponds to the predetermined second value to the connected third variability point of the source code or build script.

2. The method of claim 1, further comprising extracting at least one variability point from the source code if the source code is not composed based on a component model.

3. The method of claim 2, wherein the extracting comprises:
    searching the source code for a conditional sentence including at least one of a pre-processor and a macro;
    searching a build script corresponding to the source code for a variable related to at least one of the pre-processor and macro included in the conditional sentence of the source code; and
    extracting at least one of the searched for pre-processor and macro as a variability point only if at least one of the searched for pre-processor and macro of the source code corresponds to the searched for variable of the build script.

4. The method of claim 1, further comprising outputting a message indicating that the corresponding third value is reflected to the connected third variability point of the source code or build script.

5. The method of claim 1,
    wherein the first component is a composite component and the second component is a primitive component, and
    wherein the composite component is being composed of a plurality of primitive components including the primitive component.

6. The method of claim 1, wherein the setting comprises setting the
    predetermined value to a variability point of a root composite component from among the variability points of the components.

7. The method of claim 1, wherein the reflecting comprises:
    tracking at least one variability point of the source code or build script which corresponds to the variability points of the components; and
    reflecting the corresponding value to at least one variability point of the source code or build script in accordance with the result of tracking.

8. The method of claim 7, wherein the tracking comprises tracking the variability point of the source code or build script based on position information of at least one variability point of the source code or build script.

9. The method of claim 8, wherein the position information comprises a hash table generated by using a position of at least one variability point of the source code or build script which corresponds to the variability points of the components.

10. An apparatus for managing variability points which represent variability of components of software, the apparatus comprising:
    a connection unit which connects a first variability point of a first component to at least one variability point including a second variability point of second component and also connects the second variability point of the second component to at least one variability point including a third variability point of source code or build script;
    a setting input unit which receives an input having a predetermined first value and sets the predetermined first value to the first variability point of the first component;
    a setting reflection unit which reflects a corresponding value to the connected third variability point of the source code or build script by setting a predetermined second value which corresponds to the predetermined first value to the connected second variability point of the second component, and by setting a predetermined third value which corresponds to the predetermined second value to the connected third variability point of the source code or build script, and
    wherein at least one, of the connection unit, the setting input unit, and the setting reflection unit is a hardware component.

11. The apparatus of claim 10, further comprising an extraction unit which extracts at least one variability point from the source code if the source code is not composed based on a component model.

12. The apparatus of claim 11, wherein the extraction unit searches the source code for a conditional sentence including at least one of a pre-processor and a macro, searches a build script corresponding to the source code for a variable related to at least one of the pre-processor and macro included in the conditional sentence of the source code, and extracts at least one of the searched for pre-processor and macro as a variability point only if at least one of the searched for pre-processor and macro of the source code corresponds to the searched for variable of the build script.

13. The apparatus of claim 10, further comprising an output unit which outputs a message indicating that the corresponding third value is reflected to the connected third variability point of the source code or build script.

14. The apparatus of claim 13, wherein the output unit displays correlations among the composite and primitive components by using a graphic user interface (GUI).

15. The apparatus of claim 14, further comprising a language description unit which describes the correlations displayed by the output unit by using a programming language.

16. The apparatus of claim 10,
wherein the first component is a composite component and the second component is a primitive component, and
the composite component is being composed of a plurality of primitive components including the primitive component.

17. The apparatus of claim 10, wherein the component connection unit manages correlations between the composite and primitive components.

18. The apparatus of claim 10, wherein the setting input unit sets the predetermined value to a variability point of a root composite component from among the variability points of the components.

19. The apparatus of claim 10, wherein the setting reflection unit tracks at least one variability point of the source code or build script which corresponds to the variability points of the components and reflects the corresponding values to at least one variability point of the source code or build script in accordance with the result of tracking.

20. The apparatus of claim 19, wherein the setting reflection unit tracks the variability point of the source code or build script based on position information of at least one variability point of the source code or build script.

21. The apparatus of claim 20, wherein the position information comprises a hash table generated by using a position of at least one variability point of the source code or build script which corresponds to the variability points of the components.

22. A non-transitory computer readable recording medium having recorded thereon a computer program that causes a computer to execute a method for managing variability points, comprising the procedures of:

connecting a first variability point of a composite component to at least one variability point including a second variability including a second variability point of a primitive component and also connecting the second variability point of the primitive component to at least one variability point including a third variability point of source code or build script;

receiving an input having a predetermined first value and setting the predetermined first value to the first variability point of the composite component;

reflecting a corresponding value to the connected third variability point of the source code or build script by setting a predetermined second value which corresponds to the predetermined first value to the connected second variability point of the primitive component, and by setting a predetermined third value which corresponds to the predetermined second value to the connected third variability point of the source code or build script.

* * * * *